United States Patent
Kraus et al.

(10) Patent No.: US 9,989,184 B2
(45) Date of Patent: Jun. 5, 2018

(54) FITTING FOR AN EXHAUST PIPE

(71) Applicant: TENNECO GMBH, Edenkoben (DE)

(72) Inventors: Georg Kraus, Frankenthal (DE); Martin Weisenburger, Au am Rhein (DE); Pascal Galivel, Lauterbourg (FR)

(73) Assignee: TENNECO GMBH, Edenkoben (DE)

(*) Notice: Subject to any disclaimer, the term of this patent is extended or adjusted under 35 U.S.C. 154(b) by 259 days.

(21) Appl. No.: 14/251,905

(22) Filed: Apr. 14, 2014

(65) Prior Publication Data

US 2014/0306446 A1    Oct. 16, 2014

(30) Foreign Application Priority Data

Apr. 16, 2013 (DE) .................. 10 2013 103 808

(51) Int. Cl.
| | |
|---|---|
| F16L 27/04 | (2006.01) |
| F16L 55/07 | (2006.01) |
| F16L 9/00 | (2006.01) |
| F16L 41/00 | (2006.01) |
| F16L 41/18 | (2006.01) |
| F01N 13/00 | (2010.01) |

(52) U.S. Cl.
CPC ............ F16L 55/07 (2013.01); F01N 13/008 (2013.01); F16L 9/00 (2013.01); F16L 41/008 (2013.01); F16L 41/18 (2013.01)

(58) Field of Classification Search
USPC .......... 285/263, 261, 148.27, 184, 280, 278, 285/282, 275, 271, 262, 121.7, 51, 138.1, 285/277
See application file for complete search history.

(56) References Cited

U.S. PATENT DOCUMENTS

| | | | | |
|---|---|---|---|---|
| 39,700 | A * | 8/1863 | Morrison ............ | F16L 27/0849 285/181 |
| 218,278 | A * | 8/1879 | Kimball .................... | F16D 3/20 285/263 |
| 795,564 | A * | 7/1905 | Turner ...................... | F16L 5/00 138/35 |
| 1,099,220 | A * | 6/1914 | Ward ...................... | F16L 27/04 285/148.4 |
| 1,118,970 | A * | 12/1914 | Thompson ................ | F16L 5/00 285/138.1 |
| 1,138,281 | A * | 5/1915 | Dodge .................... | F16L 27/12 285/145.2 |
| 1,977,241 | A * | 10/1934 | Parker ..................... | F16L 19/04 285/116 |

(Continued)

FOREIGN PATENT DOCUMENTS

| | | |
|---|---|---|
| DE | 2823052 A1 | 11/1979 |
| DE | 10 2005 001 453 A1 | 7/2006 |

(Continued)

*Primary Examiner* — Aaron M Dunwoody
(74) *Attorney, Agent, or Firm* — Hudak, Shunk & Farine Co. L.P.A.

(57) ABSTRACT

A fitting for the mounting of an exhaust probe on an exhaust pipe with a base body having a central axis and secured to the exhaust pipe, with a bearing part having a longitudinal axis to accommodate the exhaust probe, wherein the bearing part and the base body are at least two-part and the bearing part can be secured in the base body in various positions, P1, P2.

13 Claims, 2 Drawing Sheets

(56) References Cited

U.S. PATENT DOCUMENTS

Figure 1:
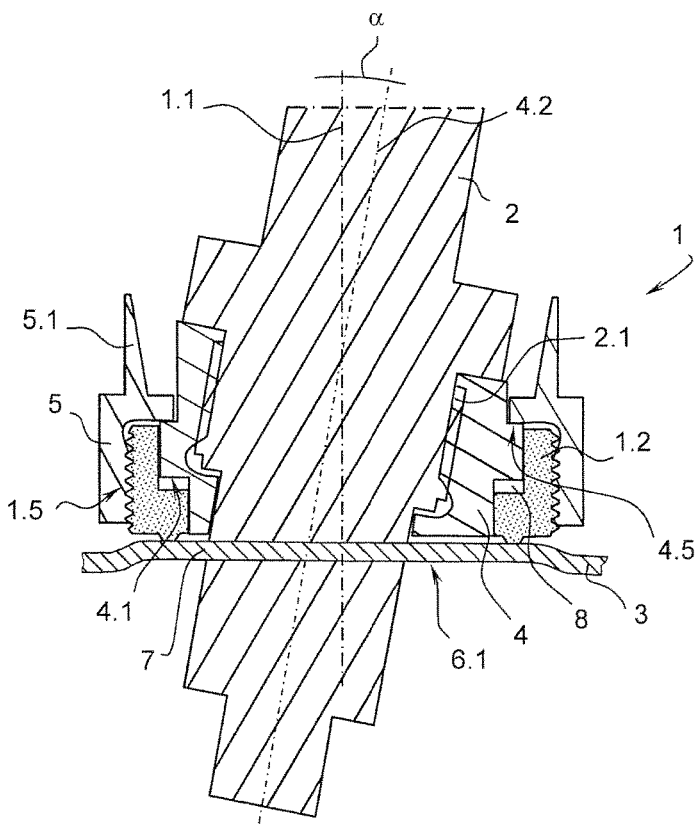

| | | | | |
|---|---|---|---|---|
| 2,465,373 A * | 3/1949 | Hall | F16L 27/04 | 285/262 |
| 2,918,313 A * | 12/1959 | Smith | F16L 19/028 | 285/179 |
| 4,813,713 A * | 3/1989 | Peaster | F16L 27/02 | 285/13 |
| 5,064,226 A * | 11/1991 | Klas | F16L 27/0849 | 285/148.19 |
| 5,332,267 A * | 7/1994 | Harrison | F16L 27/047 | 285/23 |
| 5,391,014 A * | 2/1995 | Chen | B62J 11/00 | 188/2 D |
| 5,462,230 A * | 10/1995 | Van Ouwerkerk | B60H 1/3442 | 239/428.5 |
| 5,549,634 A * | 8/1996 | Scott | A61B 17/1622 | 285/184 |
| 5,836,286 A * | 11/1998 | Timmer | F02M 39/00 | 123/470 |
| 5,975,588 A * | 11/1999 | Hesseln | F16L 27/047 | 285/263 |
| 6,123,268 A * | 9/2000 | Chastine | B05B 15/067 | 239/1 |
| 7,165,635 B2 * | 1/2007 | Kauffman | E21B 17/05 | 166/344 |
| 7,188,869 B2 * | 3/2007 | Garraffa | B63C 11/2227 | 128/202.27 |
| 7,644,777 B2 * | 1/2010 | Combs | B05B 15/065 | 169/24 |
| 7,740,287 B2 * | 6/2010 | Eide | F16L 27/04 | 285/261 |
| 8,157,295 B2 * | 4/2012 | Krywitsky | F16L 27/06 | 285/263 |
| 8,196,967 B2 * | 6/2012 | Seifert | F16L 27/047 | 285/14 |
| 8,640,857 B2 * | 2/2014 | Marchesini | B65G 33/32 | 198/658 |
| 2004/0245771 A1 * | 12/2004 | Tempas | F16L 19/0218 | 285/148.27 |
| 2015/0042087 A1 * | 2/2015 | Zaffetti | F16L 27/06 | 285/275 |

FOREIGN PATENT DOCUMENTS

| | | |
|---|---|---|
| DE | 10 2005 018 881 A1 | 10/2006 |
| DE | 10 2006 044 736 A1 | 3/2008 |
| DE | 102008047555 A1 | 4/2010 |
| EP | 1 793 100 B1 | 2/2011 |
| FR | 2 867 252 A1 | 9/2005 |

* cited by examiner

Fig. 3a
Fig. 3b
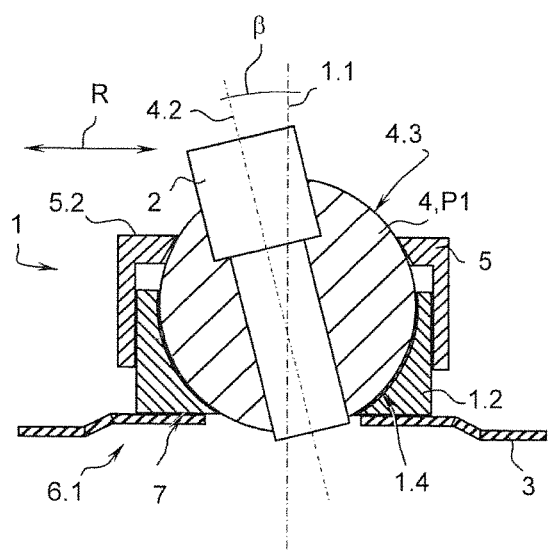
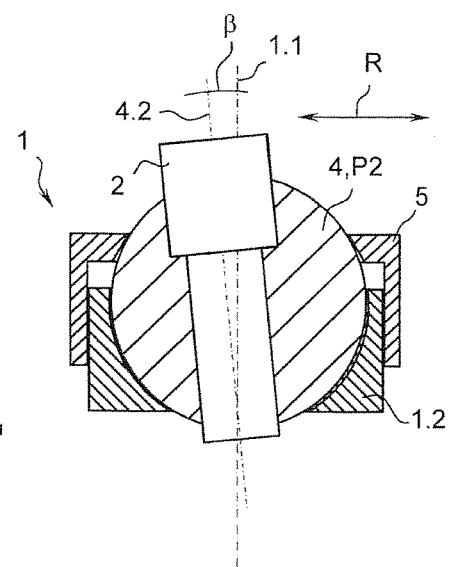
Fig. 4
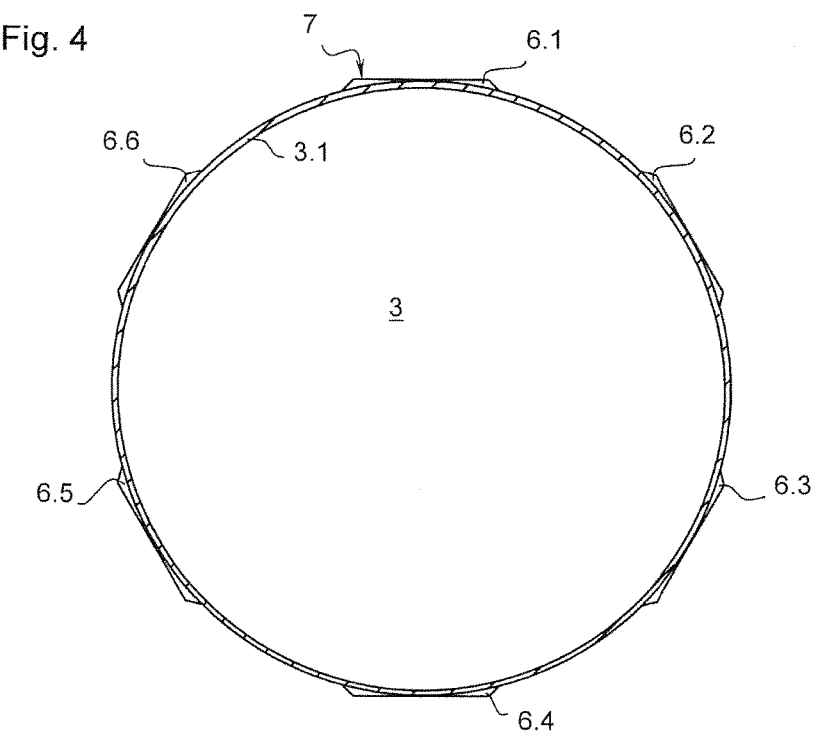

FITTING FOR AN EXHAUST PIPE

FIELD OF THE INVENTION

The invention pertains to a fitting for an exhaust probe on an exhaust pipe with a base body having a central axis and secured to the exhaust pipe, with a bearing part having a longitudinal axis to accommodate the exhaust probe.

BACKGROUND OF THE INVENTION

A fitting to hold an exhaust probe which is fastened to an exhaust gas line is already known from DE 10 2005 018 881 A1. An end section of the fitting, which protrudes through an opening in the wall of the exhaust gas line, is convex curved. The fitting has an internal thread for the exhaust probe, so that the exhaust probe is screwed in coaxially to a center axis of the fitting. Thanks to the end section being in the shape of a partial sphere, the fitting can be welded onto the exhaust gas line in various angled positions.

A fitting to accommodate an exhaust probe that is fastened to an exhaust gas line is also known from EP 1 793 100 BI. The fitting is wedge shaped, so that the exhaust probe is arranged in a defined angle position to the exhaust gas line.

SUMMARY OF THE INVENTION

The problem of the invention is to design and arrange a fitting for exhaust probes for an exhaust gas system so that an improved handling is assured.

The problem is solved according to the invention in that the bearing part and the base body are at least two-part and the bearing part can be secured in the base body in various positions, such as positions P1, P2. Thanks to the two-part design of base body and bearing part, it is possible to orient the bearing part and therefore the probe arranged therein independently of the orientation of the base body, preferably continuously. This independent relative orientation between bearing part and base body is thus assured both in the peripheral direction to the central axis and also or alternatively by an inclination of the bearing axis relative to the central axis. In this way, the probe arranged in the bearing part thanks to the inclination of the bearing part itself or its bearing axis can be placed in many different positions P1, P2 by a twisting or swiveling movement about the central axis according to the given tilting or inclination. Alternatively or in addition to this, thanks to the preferably continuous swiveling of the bearing part inside the base body, one can assure the many different positions P1, P2 of the bearing part and thus of the probe independently of the position of the base body on the exhaust pipe. The bearing part is sealed against the base body in the axial direction by a gasket. The exhaust probe is sealed in traditional manner against the bearing part.

The aforementioned term "two-part" includes all the variants which ensure a relative movement between the bearing part and the base body. As a limit case, one can understand this to be a one-piece embossing which thanks to the given elasticities ensures this relative movement between bearing part and base body as a flexure bearing. Thus, for example, by using single-piece spring and/or web elements between bearing part and base body, which allow for said relative movement between bearing part and base body.

It can also be advantageous here for the longitudinal axis to be inclined relative to the central axis by an angle α, and for the bearing part in the loosened state to be able to turn relative to the base body in a circumferential direction U relative to the central axis (to be brought into positions P1, P2). The securing of the bearing part inside the base body is easily possible by the use of a holding part.

Moreover, it can be advantageous when the bearing part in the loosened state is able to turn in relation to the longitudinal axis relative to the base body in the circumferential direction U to the central axis and/or in a radial direction R to the central axis by an angle ß, whereby the bearing part can be brought into the different positions P1, P2 relative to the base body. A threaded pair enables the use of threaded nuts, which are very easy to handle. Alternatively to this, bayonet locks or the like can also be provided, by means of which the desired axial force is assured for the securing of the bearing part.

It can also be advantageous to provide a holding part by which the bearing part can be biased directly or indirectly against the base body for its fastening. With the holding part, the fitting is a three-part one. Alternatively to the use of the holding part, the bearing part can be screwed together with the base body. Thanks to the continuous configuration of this turning and/or swiveling movement in the circumferential direction about the central axis and/or said angle ß, a free choice in regard to the particular position P1, P2 guarantees to the user an individual adjustment when mounting the probe in regard to the available space and installation conditions. Alternatively to this, a stepped configuration and therefore a discrete adjustment can also be practicable, insofar as the different steps of this inclination are sufficiently small so that the greatest possible selection is afforded to the user in terms of different positions.

It can be advantageously provided that the base body and the holding part have an intermeshing thread pair and are adjustable relative to each other in the axial direction relative to the central axis via the threaded pair. Thanks to the use of an abutment shoulder, the bearing part can be brought to bear against the base body, optionally with the additional use of a gasket or a sealing means.

The bearing part has an abutment shoulder that can be placed directly or indirectly against the base body.

The bearing part has a holding shoulder against which the holding part can be placed for an axial biasing.

It can be especially important for the present invention when the bearing part can be continuously rotated or swiveled between the positions P1, P2 inside the base body in the circumferential direction U to the central axis and/or in the radial direction R to the central axis. The holding shoulder assures a firm seating of the bearing part, and therefore the biasing of the bearing part against the base body or the aforementioned seal between bearing part and base body.

In the context of the configuration and arrangement according to the invention, it can be advantageous for the bearing part to have a partially spherical outer surface and for the base body to have a spherical section, in which the bearing part is movably mounted by means of the outer surface. Thanks to the use of the partially spherical outer surface, mounted inside the spherical section, the aforementioned inclination or swivel movement about the angle ß is ensured for an inclination of the bearing part and thus the probe. The partially spherical outer surface can also be easily secured by means of the holding part inside the bearing part, just as occurs for the bearing part with abutment and holding shoulder. Besides the orienting of the bearing part in relation to the circumferential direction to the central axis, thanks to the use of the partially spherical outer surface the user can also ensure any desired inclination and thus angle ß, in order to allow for the given mounting or installation situations. The sealing action between the bearing part and the base body is ensured by the spherical section, and optionally by an additional sealing between the bearing part and the base body. The exhaust probe is sealed in traditional manner with respect to the bearing part.

It can moreover be advantageous for the holding part to bear against the outer surface of the bearing part for purposes of an axial biasing of the bearing part. For this, the holding part preferably has a concave clamping surface, copying the outer surface. This prevents a deformation of the outer surface.

The problem is also solved by an exhaust pipe with a fitting as described above.

The problem is likewise solved by an exhaust pipe with a pipe wall and with at least one molding arranged in the pipe wall for the connecting of a fitting.

If can be advantageous to provide several moldings distributed about the circumference U of the exhaust pipe.

Thanks to the presence of several moldings, preferably four to eight such moldings distributed about the circumference of the exhaust pipe, the user is free to choose his own arrangement or positioning on the exhaust pipe according to the installation or construction conditions, independently of the flexibility in regard to the orientation or inclination of the bearing part as described above.

Finally, it can be advantageous for the molding to have a planar contact zone, at least in the shape of a circular ring, against which the fitting can bear. The circular ring configuration of the contact zone ensures an at least linear contact or a linear bearing between the base body and the exhaust pipe, so that the base body can be coupled to the exhaust pipe by using a friction or welding method.

BRIEF DESCRIPTION OF THE INVENTION

Figure 2A:
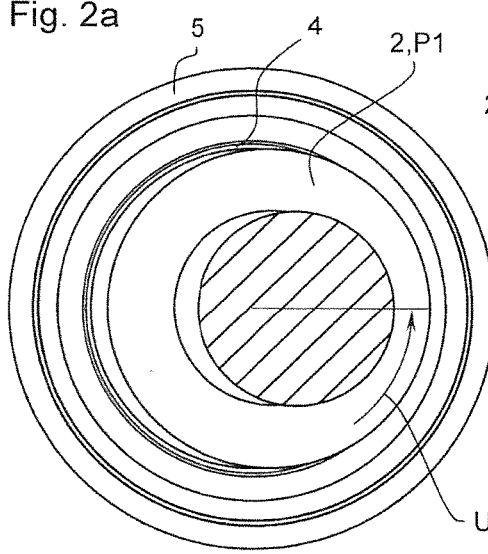

Further benefits and features of the invention are explained in the patent claims and in the specification, and depicted in the figures. There are shown:

FIG. 1, a sectional view of the fitting with probe;

FIG. 2a, b, a schematic representation seen from above in two different positions P1, P2;

FIG. 3a, b, an alternative sample embodiment of the fitting;

FIG. 4, a diagram of a sectional view of the exhaust pipe with several moldings.

DETAILED DESCRIPTION OF THE INVENTION

A fitting 1 depicted in FIG. 1 has a base body 1.2, which is firmly connected by a frictional weld connection to an exhaust pipe 3. For this, the exhaust pipe 3 has a molding 6.1 with a flat contact zone 7, against which the base body 1.2 can bear at least in linear manner.

Within the base body 1.2 fastened in this way to the exhaust pipe 3 there is provided a bearing part 4, which serves to receive a probe 2. The probe 2 is screwed by a thread 2.1 inside the bearing part 4 and sealed in traditional manner. Said thread 2.1 is arranged coaxially to a longitudinal axis 4.2 of the bearing part 4. The longitudinal axis 4.2 is inclined by an angle α relative to a central axis 1.1 of the base body 1.2, so that the probe 2 screwed into the bearing part 4 is inclined accordingly by the angle α relative to the central axis 1.1.

The bearing part 4 has an abutment shoulder 4.1, by which it can bear at least indirectly across a sealing body 8 in the base body 1.2 against the base body 1.2 in the axial direction to the central axis 1.1.

A holding part 5 is provided for the securing or fixation of the bearing part 4, being screwed onto the base body 1.2 by a thread pair 1.5. For this, the holding part 5 has a hexagonal geometry 5.1, not otherwise depicted, by means of which it can be screwed or tightened with the use of traditional wrenches. Opposite the already mentioned abutment shoulder 4.1, the bearing part 4 has a holding shoulder 4.5, against which the holding part 5 can bear in the axial direction to the central axis 1.1 or be clamped so that the holding part 4 is tightly secured by the sealing body 8 in the base body 1.2.

When the holding part 5 is loosened, the bearing part 4 can be turned continuously in the circumferential direction to the central axis 1.1, so that the orientation of the probe 2 in relation to the inclination by the angle α of 160 degrees can be freely chosen.

Figure 2B:
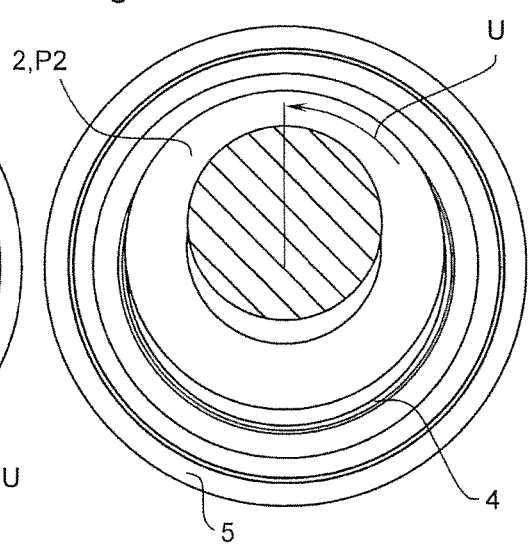

The latter is sketched in FIGS. 2a and 2b. While in FIG. 2a the probe 2 is arranged tilted to the right in position P1, according to FIG. 2b it is turned by 90 degrees in the circumferential direction and finds itself here in position P2, inclined upward. FIGS. 2a and 2b constitute a top view diagram of FIG. 1. The exhaust pipe 3 is not shown here.

According to another sample embodiment per FIGS. 3a and 3b, the holding part 5 is spherical or has a partially spherical outer surface 4.3, which is mounted inside a spherical section 1.4 of the base body 1.2. The bearing part 4 can thus be inclined by any given angle ß within the base body 1.2 and also be rotated arbitrarily in the circumferential direction to the central axis 1.1 according to FIGS. 2a and 2b A holding part 5 is likewise provided for securing the bearing part 4, being screwed onto the base body 1.2 by a thread, not otherwise depicted, and able to be clamped in the axial direction against the bearing part 4 by a shoulder 5.2, so that the bearing part 4 can be secured in the spherical section 1.4. According to FIG. 3b, the bearing part 4 is secured in a position P2 with a smaller inclination angle ß, differing from FIG. 3a. Thus, the probe 2 in FIG. 3a is in position P1 and in FIG. 3b it is likewise in position P2 with a smaller angle of inclination ß.

In FIG. 4, the exhaust pipe 3 or a pipe wall 3.1 has six moldings 6.1 to 6.6 distributed about the periphery, which serve to support or receive the base body 1.2. The respective moldings 6.1 to 6.6 have a flat contact zone 7, which as mentioned has an at least linear abutment of the base body 1.2, preferably for purposes of employing a friction/welding method.

LIST OF REFERENCE NUMBERS 1 fitting
1.1 central axis
1.2 base body
1.4 spherical section
1.5 threaded pair
2 exhaust probe
2.1 thread
3 exhaust pipe
3.1 pipe wall
4 bearing part
4.1 abutment shoulder
4.2 longitudinal axis
4.3 outer surface
4.5 holding shoulder
5 holding part
5.1 hexagonal geometry
5.2 shoulder
6.1 molding
6.2 molding 6.3 molding
6.4 molding
6.5 molding
6.6 molding
7 contact zone
8 sealing body
α angle
ß angle
P1 position
P2 position
R direction, radial
U circumferential direction

What is claimed is:

1. An exhaust pipe with an exhaust probe, comprising:
a fitting for the mounting of the exhaust probe on the exhaust pipe,
the fitting having a base body having a central axis, and a bearing part accommodated inside the base body and adjoining the base body by an outer surface of the bearing part and being adjusted by said bearing part outer surface coaxially to said central axis, wherein the bearing part and the base body are at least two-part, the bearing part having an inner surface to which the exhaust probe is connected, wherein said bearing part inner surface defines a longitudinal axis of the bearing part wherein the longitudinal axis is inclined relative to the central axis by an angle α, wherein the bearing part inner surface defines an inclination of the exhaust probe according to said angle α, the bearing part can be secured in the base body in a circumferential direction U relative to the central axis in various positions, P1, P2, and wherein the exhaust probe is positioned in the bearing part and protrudes from a first side and a second side opposite to the first side of the bearing part in relation to the longitudinal axis.

2. The exhaust pipe according to claim 1, wherein a holding part is provided, by which the bearing part can be biased directly or indirectly against the base body for its fastening.

3. The exhaust pipe according to claim 2, wherein the base body and the holding part have an intermeshing thread pair and are adjustable relative to each other in the axial direction relative to the central axis via the threaded pair.

4. The exhaust pipe according to claim 3, wherein the bearing part can be continuously rotated or swiveled between the positions P1, P2 inside the base body in the circumferential direction U to the central axis.

5. The exhaust pipe according to claim 2, wherein the holding part can bear against the outer surface of the bearing part for purposes of an axial biasing of the bearing part.

6. The exhaust pipe according to claim 1, wherein the bearing part has a partially spherical outer surface and the base body has a spherical section, in which the bearing part is movably mounted by an outer surface.

7. The exhaust pipe according to claim 1, further comprising a pipe wall and at least one molding arranged in the pipe wall connected to the fitting.

8. The exhaust pipe according to claim 7, wherein several moldings are provided, distributed about a circumference U of the exhaust pipe.

9. The exhaust pipe according to claim 8, wherein the at least one molding has a planar contact zone, at least in a shape of a circular ring, against which the fitting can bear.

10. The exhaust pipe according to claim 7, wherein the at least one molding has a planar contact zone, at least in a shape of a circular ring, against which the fitting can bear.

11. The exhaust pipe according to claim 1, wherein the bearing part can be continuously rotated or swiveled between the positions P1, P2 inside the base body in the circumferential direction U to the central axis.

12. The exhaust pipe according to claim 11, wherein the bearing part has a partially spherical outer surface and the base body has a spherical section, in which the bearing part is movably mounted by an outer surface.

13. The exhaust pipe according to claim 12, wherein the holding part can bear against the outer surface of the bearing part for purposes of an axial biasing of the bearing part.

* * * * *